United States Patent [19]

Zibell et al.

[11] Patent Number: 5,112,625

[45] Date of Patent: May 12, 1992

[54] AQUEOUS ZEIN COATED SWEETENERS AND OTHER INGREDIENTS FOR CHEWING GUM

[75] Inventors: Steven E. Zibell, Tinley Park; Robert J. Yatka, Orland Park; Henry T. Tyrpin, Palos Hills, all of Ill.

[73] Assignee: Wm. Wrigley Jr. Company, Chicago, Ill.

[21] Appl. No.: 565,605

[22] Filed: Aug. 9, 1990

Related U.S. Application Data

[63] Continuation-in-part of Ser. No. 383,291, Jul. 17, 1989, which is a continuation of Ser. No. 205,495, Jun. 6, 1988, abandoned, which is a continuation of Ser. No. 921,753, Oct. 22, 1986, abandoned, and a continuation-in-part of Ser. No. 311,125, Feb. 15, 1989, and Ser. No. 4,005, Jul. 17, 1990, and Ser. No. 2,255, Apr. 25, 1990, and Ser. No. 1,269, Mar. 28, 1989, and Ser. No. 3,764, Aug. 30, 1989, and Ser. No. 5,296, Nov. 22, 1989, and Ser. No. 4,400, Dec. 9, 1988, abandoned.

[51] Int. Cl.⁵ .............................................. A23G 3/30
[52] U.S. Cl. ....................................... 426/5; 426/548; 426/302; 426/96
[58] Field of Search .................. 426/3, 548, 96, 5, 302

[56] References Cited

U.S. PATENT DOCUMENTS

| | | |
|---|---|---|
| 2,154,482 | 4/1939 | Weber . |
| 2,236,521 | 4/1941 | Coleman . |
| 2,489,147 | 11/1949 | Lougovoy . |
| 3,010,953 | 11/1961 | Unger et al. .......................... 530/373 |
| 3,068,062 | 12/1962 | Morgan, Jr. . |
| 3,116,206 | 12/1963 | Brynko et al. . |
| 3,576,663 | 4/1971 | Signorino et al. . |
| 4,137,300 | 1/1979 | Sheth et al. . |
| 4,139,639 | 2/1979 | Bahoshy et al. . |
| 4,194,013 | 3/1980 | Rehacek et al. . |
| 4,224,219 | 9/1980 | Van Blanton et al. ............. 530/373 |
| 4,230,687 | 10/1980 | Sair et al. . |
| 4,384,004 | 5/1983 | Cea et al. .......................... 426/548 X |
| 4,386,106 | 5/1983 | Merritt et al. . |
| 4,474,749 | 10/1984 | Kruppa . |
| 4,515,769 | 5/1985 | Merritt et al. . |
| 4,597,970 | 7/1986 | Sharma et al. . |
| 4,634,593 | 1/1987 | Stroz et al. . |
| 4,863,745 | 9/1989 | Zibell . |
| 4,931,295 | 6/1990 | Courtright et al. . |

FOREIGN PATENT DOCUMENTS

| | | |
|---|---|---|
| 0067595A2 | 12/1982 | European Pat. Off. . |
| 0320522A1 | 6/1989 | European Pat. Off. . |
| 0320523A1 | 6/1989 | European Pat. Off. . |
| 0343775 | 11/1989 | European Pat. Off. . |
| 0383428A2 | 8/1990 | European Pat. Off. . |
| 3043914A1 | 6/1981 | Fed. Rep. of Germany . |
| 2117506 | 6/1972 | France . |
| 57-14273 | 9/1982 | Japan . |
| 63-28575 | 9/1982 | Japan . |
| 61-268153 | 11/1986 | Japan . |
| WO89/03170 | 4/1989 | PCT Int'l Appl. . |
| WO89/05589 | 6/1989 | PCT Int'l Appl. . |
| WO89/11212 | 11/1989 | PCT Int'l Appl. . |
| WO90/06061 | 6/1990 | PCT Int'l Appl. . |
| WO90/07859 | 7/1990 | PCT Int'l Appl. . |
| WO90/07864 | 7/1990 | PCT Int'l Appl. . |

Primary Examiner—Joseph Golian
Attorney, Agent, or Firm—Willian Brinks Olds Hofer Gilson & Lione

[57] ABSTRACT

A method of making zein coated, high-potency sweeteners or other gum ingredients that does not use alcohol is disclosed. A solution of zein and water at a pH of between about 11.5 and about 12.1 is prepared, containing between about 1% and about 25% by weight zein, and the aqueous zein solution is combined with a high-potency sweetener or other gum ingredients to form a zein-coated ingredient. The zein coated ingredient is then used to make chewing gum. Preferable coating steps include spray drying and fluid bed coating.

12 Claims, 1 Drawing Sheet

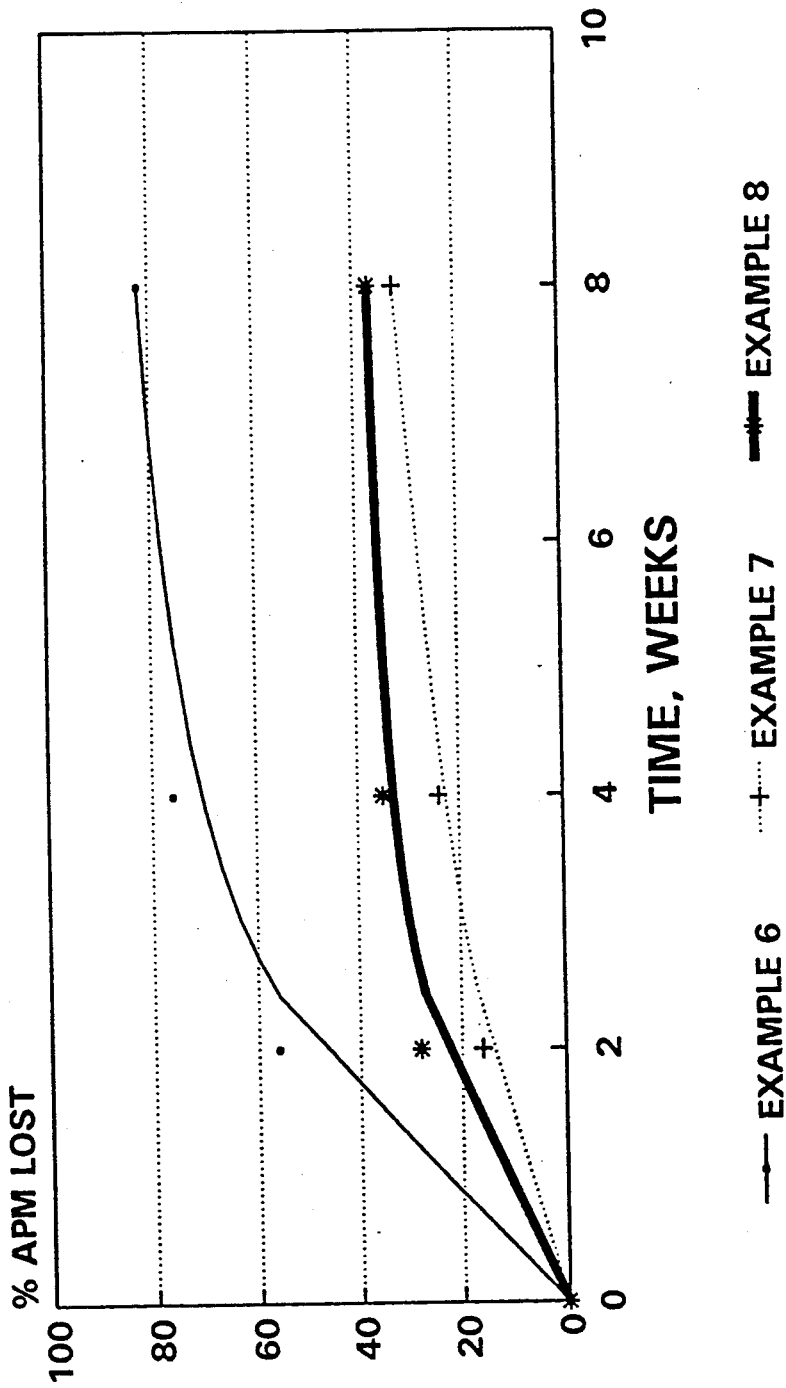

AQUEOUS ZEIN COATED SWEETENERS AND OTHER INGREDIENTS FOR CHEWING GUM

CROSS REFERENCE TO RELATED APPLICATION

The present application is a continuation-in-part application of U.S. patent application Ser. No. 07/383,291 filed Jul. 17, 1989, which is a continuation of U.S. patent application Ser. No. 07/205,495 filed Jun. 6, 1988, abandoned, which in turn was a continuation of U.S. patent application Ser. No. 06/921,753, filed Oct. 22, 1986, abandoned. The application is also a continuation-in-part of U.S. application Ser. No. 07/311,125, filed Feb. 15, 1989 as well as a continuation-in-part of the following pending PCT applications designating the United States: PCT/US88/04400 filed Dec. 9, 1988 now abandoned; PCT/US89/01269 filed on Mar. 28, 1989; PCT/US89/03764, filed Aug. 30, 1989; PCT/US89/05296, filed Nov. 22, 1989, PCT/US90/02255, filed Apr. 25, 1990, and PCT/US90/04005, filed Jul. 17, 1990. Each of the above U.S. and PCT applications are hereby incorporated by reference.

BACKGROUND OF THE INVENTION

The present invention relates to coating of high-potency sweeteners and other gum ingredients with aqueous solutions of zein, particularly for use in chewing gum, and more particularly to improve the stability of the sweetener in the gum and/or control the release of the sweetener or other ingredient from the gum.

Zein is a protein compound that has been known as a coating agent. Most commonly, zein is mixed with alcohol to make a spray dry encapsulating solution. However, the use of alcohol in such spray coating techniques presents special problems, especially where the coated product is used in food products such as chewing gum. First, a food grade alcohol must be used. Second, because alcohol is flammable, extra safety precautions must be used.

Coating with zein or other encapsulating agents is useful to protect sensitive gum ingredients. Also, coating may be helpful to control the release of material from chewing gum. High-potency sweeteners are particularly of interest in chewing gum, and coating is thus of interest to improve the stability of the sweetener in chewing gum and/or control its release in chewing gum. Numerous patents address different sweeteners, coating agents and coating techniques.

For example, U.S. Pat. No. 4,597,970 to Sharma et al. teaches a process for producing an agglomerated sweetener wherein the sweetener is dispersed in a hydrophobic matrix consisting essentially of lecithin, a glyceride, and a fatty acid or wax having a melting point between 25° C. and 100° C. The method disclosed uses a spray-congealing step to form the sweetener-containing matrix into droplets, followed by a fluid bed second coating on the agglomerated particles.

U.S. Pat. Nos. 4,515,769 and 4,386,106, both to Merrit et al., teach a two step process for preparing a delayed release flavorant for chewing gum. In this process, the flavorant is prepared in an emulsion with a hydrophilic matrix. The emulsion is dried and ground, and the resulting particles are then coated with a water-impermeable substance.

U.S. Pat. No. 4,230,687 to Sair et al. teaches a process for encasing an active ingredient to achieve gradual release of the ingredient in a product such as chewing gum. The method described involves adding the ingredient to an encapsulating material in the form of a viscous paste. High-shear mixing is used to achieve a homogeneous dispersion of the ingredient within the matrix, which is subsequently dried and ground.

U.S. Pat. No. 4,139,639 to Bahoshy et al. teaches a process of "fixing" aspartame by co-drying (by spray drying or fluid bed coating) a solution containing aspartame and an encapsulating agent, such as gum arabic, to thereby surround and protect the aspartame in the gum during storage.

U.S. Pat. No. 4,384,004 to Cea et al. teaches a method of encapsulating aspartame with various solutions of encapsulating agents using various encapsulation techniques, such as spray drying, in order to increase the shelf-stability of the aspartame.

U.S. Pat. No. 4,634,593 to Stroz et al. teaches a method for producing controlled release sweeteners for confections, such as chewing gum. The method taught therein involves the use of a insoluble fat material which is mix mulled with the sweetener.

U.S. Pat. Nos. 2,154,482 and 2,489,147 use zein as a gum base ingredient. U.S. Pat. Nos. 3,010,953 and 4,224,219 disclose a modified zein to make it more water soluble. These patents also indicate that high pH aqueous zein films are not stable, as the alkali degrades the protein film.

U.S. Pat. No. 3,068,062 discloses the use of aqueous zein to make textile fibers. U.S. Pat. No. 3,116,206 discloses coacervated zein in aqueous solutions plus polymers like CMC to form an encapsulant. Other patents disclose the use of zein for coating, but use zein and/or alcohol/aqueous mixtures to solubilize zein for encapsulation. These patents are French Patent Nos. 2,117,506 and U.S. Pat. Nos. 4,194,013; 4,137,300; 4,384,004; and 4,474,749.

It would be of benefit to use zein as a coating agent for chewing gum ingredients without using alcohol as a solvent.

SUMMARY OF THE INVENTION

A method of making zein coated, high-potency sweeteners or other gum ingredients have been developed that does not use alcohol. A solution of zein and water at a pH of between about 11.5 and about 12.1 is prepared, containing between about 1% and about 25% by weight zein, and the aqueous zein solution is combined with the high-potency sweetener or other gum ingredient to form a zein coating on the ingredient. Coating techniques particularly useful include spray drying and fluid bed coating.

BRIEF DESCRIPTION OF THE DRAWING

FIG. 1 depicts the results of a "chew out" test using coated aspartame of the present invention compared to uncoated aspartame and aspartame coated with zein from an alcohol solution.

DETAILED DESCRIPTION OF THE DRAWING AND THE PREFERRED EMBODIMENTS OF THE INVENTION

Unless specified otherwise, all percents used herein and in the appended claims are weight percents. Also, the term "chewing gum" includes conventional chewing gum, bubble gum and the like.

Zein is a protein of the prolamine class derived from corn. Specifically, zein is obtained in powder form and is yellow, tasteless and is generally known to be insoluble in water and soluble in alcohol. In the most preferred embodiment the zein is obtained from the Freeman Co.

Zein has been known in the past to be used as a coating material. However, in these uses, the zein was typically dissolved in ethyl alcohol. Naturally, the use of ethyl alcohol requires the installation of additional equipment to reduce the danger from explosions, fire or toxic effects. The preferred embodiments of the invention avoid these problems by using zein in an aqueous solution. An aqueous solution of zein is made possible by virtue of the fact that the aqueous solution is maintained at a relatively high-pH, i.e. between about 11.5 and about 12.1. In this pH range, it has been found that the zein is significantly more soluble than in neutral water. Typically, when mixed with neutral water, zein powder will flow on the top of the water without any appreciable solution, or even suspension of the zein within the water. Accordingly, it is not possible to coat particles with a solution of zein in neutral water.

In contrast, when mixed into water which has a pH of between about 11.5 and 12.1, it is possible to get significant solution and suspension of zein particles within the water. In particular, it has been found that an aqueous solution of zein can be formed which contains up to 25% by weight zein. At a level of 25%, the major portion of the zein is solvated, with only a minor portion being suspended within the solution.

The aqueous solution of zein is prepared by adding the desired amount of zein to a quantity of water along with an amount of base sufficient to create a pH between about 11.5 and about 12.1. Preferably, sodium hydroxide is added to the water in sufficient quantity to create a pH between 11.6 and 11.9. It is preferred to add the zein and base simultaneously in increments while stirring. Alternatively, either the zein or the base can be added to the water before the other. Alternatively, other food grade acceptable bases can be used. Generally, the zein solution should contain between about 1 and about 25% by weight zein. Preferably, the zein solution should have a zein content of between about 5 and about 20% by weight. More preferably, the zein content will be between about 13 and about 18% by weight, most preferably about 16% percent by weight. As noted above, the zein content is higher than would be available without the high-pH level of the water.

A high-pH aqueous zein solution can be used to coat high-potency sweeteners and other ingredients used to make chewing gum. The coated sweeteners will have a modified release rate and/or improved stability. The ingredients most useful in the invention include high-potency sweeteners, food acids, emulsified flavors, and other gum ingredients.

High-potency sweeteners of particular interest include aspartame, alitame, acesulfame K and other acesulfame salts, sucralose, saccharin and its salts, cyclamic acid and its salts, thaumatin, monellin, glycyrrhizin, dihydrochalcones, stevioside and combinations thereof.

The coating techniques include those which use zein in a solution, such a spray drying, fluid bed coating, coacervation, agglomeration and combinations thereof. Spray drying and fluid bed coating, in which zein has typically been used in an alcohol solution, are particularly well suited for the present invention.

Physical modification of high-potency sweeteners by encapsulation with zein will slow its release in chewing gum by reducing the solubility or the solution rate of the sweetener. Any standard technique that gives partial or full encapsulation of the sweetener can be used. The encapsulation techniques that give partial encapsulation or full encapsulation can be used individually or in any combination, in a single step process or multistep process. Generally, a delayed release of sweeteners is obtained in multistep processes like spray drying the sweetener and then fluid bed coating of the resulting powder.

The encapsulation techniques here described are standard coating techniques and generally get varying degrees of coating, from partial to full coating, depending on the amount of coating used in the process.

Also, the coating composition may be susceptible to water permeation to various degrees. The amount of coating or encapsulation material on the sweetener also controls the length of time for its release from chewing gum.

Generally, the higher the level of coating and the lower the amount of active sweetener, the slower the release of the sweetener during mastication. The release rate is generally not instantaneous, but gradual over an extended period of time. To obtain the desired sweetness release to blend with the gum's flavor release, the encapsulant should be a minimum of about 20% of the coated sweetener. Preferably, the encapsulant should be a minimum of about 30% of the coated sweetener, and most preferably should be a minimum of about 40% of the coated sweetener. Depending on the coating process, a higher or lower amount of coating material may be needed to give the desired release of sweetener to balance sweetness release with flavor release.

Another method of giving a delay-release of the sweetener is agglomeration of the sweetener with an agglomerating agent which partially coats the sweetener. This method includes the step of mixing the sweetener and an agglomerating agent with a small amount of water. The mixture is prepared in such a way as to have individual wet particles in contact with each other so that a partial coating can be applied. After the water is removed, the mixture is ground and used as a powder, coated sweetener.

The sweetener may be coated in a two-step process or multiple step process. The sweetener may be encapsulated with zein as described previously and then the encapsulated sweetener can be agglomerated as described previously to obtain an encapsulated/agglomerated/sweetener product that can be used in chewing gum to give a delay-release sweetener.

The present invention can be used in a multiple-step process, where a high-pH zein solution is used in one or more of the steps. Three methods to obtain a delay-release of sweetener are: (1) encapsulation by spray drying, fluid bed coating, spray chilling and coacervation to get full or partial encapsulation; (2) agglomeration to get partial encapsulation and (3) fixation or entrapment/adsorption which also gives partial encapsulation. Any of these three methods, or any other suitable method which physically isolates a sweetener, reduces its dissolvability or slows down the release of sweetener, may be combined with a coating method using a high-pH zein solution, and are thus included in this invention.

Sweeteners or other ingredients that are not sensitive to high-pH can be spray dried with aqueous, high-pH zein. Even the ingredients which are sensitive to a high-pH environment, like aspartame, can be fluid bed coated because the high-pH zein solution is sprayed onto the ingredient and immediately dried.

Since zein is a protein, it is not stable with some gum ingredients at a high-pH. For example, in spray drying acesulfame K, a solution of acesulfame K and high-pH aqueous zein are blended together. It was found that when a 10% zein solution at a pH of 11.7 was added to a 10% solution of acesulfame K, a precipitate or coagulate formed immediately. This appeared to be denatured zein protein, presumably caused by the presence of acesulfame K salt. Zein appeared to coagulate even if added slowly, such as adding a 10% aqueous zein solution with a pH of 11.7 to a 5% acesulfame K solution. Also, when a 10% acesulfame K solution with a pH of 11.8 was added to a 10% zein solution with a pH of 11.7, the coagulate formed very slowly. However, when a 5% acesulfame K solution at pH 11.8 was added to a 10% zein solution at a pH of 11.7, no coagulate formed. When coating cyclamate and saccharin salts, similar precautions may also be required to avoid coagulating the zein.

The previously described encapsulated, agglomerated or absorbed high-potency sweetener may readily be incorporated into a chewing gum composition. The remainder of the chewing gum ingredients are non-critical to the present invention. That is, the coated particles of high-potency sweetener can be incorporated into conventional chewing gum formulations in a conventional manner. Naturally, the preferred chewing gum formulation is a sugarless chewing gum. However, the high-potency sweeteners may also be used in a sugar chewing gum to intensify and/or extend the sweetness thereof. The coated high-potency sweetener may be used in either regular chewing gum or bubble gum.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomer, resins, fats and oils, waxes, softeners and inorganic fillers. Elastomers may include polyisobutylene, isobutyle-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and coca butter. Commonly employed waxes include paraffin, microcrystalline and natural waxes such as beeswax and carnauba. According to the preferred embodiment of the present invention, the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

As mentioned above, the coated high-potency sweeteners of the present invention will most likely be used in sugarless gum formulations. However, formulations containing sugar are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The coated high-potency sweeteners of the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol and the like, alone or in any combination.

Depending on the particular sweetness release profile and shelf-stability needed, the coated high-potency sweeteners of the present invention can also be used in combination with uncoated high-potency sweeteners or with high-potency sweeteners coated with other materials and by other techniques.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further portions of the bulking agent may then be added to the mixer. A flavoring agent is typically added with the final portion of the bulking agent. The coated sweetener of the present invention is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLE 1

(Comparative)

Aspartame was fluid bed coated with a 20% zein in ethyl alcohol solution. The inlet temperature ranged from 170° F. to 195° F. The outlet temperature ranged from 70° F. to 95° F. Atomizing air was supplied at 24 to 30 psi. A 2,243 gram quantity of zein solution was used to coat 908 grams of aspartame. The active level of aspartame was estimated to be 60-percent.

EXAMPLE 2

A 2,280 gram quantity of 10% zein in water solution made to a pH of 11.5 was used to fluid bed coat 908 grams of aspartame. The inlet and outlet temperatures ranged between 170° to 185° F. and 90° to 113° F., respectively. Atomizing air was provided at 50 psi. The estimated level of aspartame in the coated sweetener was 66%.

EXAMPLES 3-5

(Examples 3 and 4 Comparative)

Gum was prepared using the coated aspartame of Examples 1 and 2, and with uncoated aspartame, with the following formulation:

|  | Example 3 | Example 4 | Example 5 |
| --- | --- | --- | --- |
| Gum Base | 25.5% | 25.5% | 25.5% |
| Lecithin | 0.2 | 0.2 | 0.2 |
| Sorbitol | 49.3 | 49.2 | 49.2 |
| Mannitol | 8.0 | 8.0 | 8.0 |
| Glycerin | 8.6 | 8.6 | 8.6 |
| Lycasin | 6.8 | 6.8 | 6.8 |
| Peppermint Flavor | 1.4 | 1.4 | 1.4 |
| Sweetener | 0.2[a] | 0.3[b] | 0.3[c] |
|  | 100.0% | 100.0% | 100.0% |

[a]Uncoated aspartame
[b]Aspartame coated in Example 1
[c]Aspartame coated in Example 2

A comparison of the release rates of the aspartame in the gums of Example 3 through 5 was made by conducting "chew out" tests and determining the amount of aspartame lost from the gum at 1, 3, 6, and 18 minutes. The results are shown in FIG. 1. The slows release of Example 5 compared to Example 3 shows that the use of aqueous, high-pH zein significantly slow the release rate of aspartame from the gum. A comparison of Example 5 compared to Example 4 shows that the release rate of the aqueous, high-pH zein coated aspartame is almost as slow as the release of aspartame coated from an alcohol/zein solution. However, no alcohol was used in preparing the Example 2 coated sweetener, nor were special precautions required as usually used when fluid bed coating is conducted with flammable solvents.

EXAMPLES 6-8

(Examples 6 and 7 Comparative)

Gum was prepared using the coated aspartame of Examples 1 and 2, and with uncoated aspartame, with the following formulations:

|  | Example 6 | Example 7 | Example 8 |
| --- | --- | --- | --- |
| Gum Base | 27.0% | 27.0% | 27.0% |
| Sorbitol | 40.3 | 40.0 | 40.15 |
| Mannitol | 12.0 | 12.0 | 12.0 |
| Glycerin | 8.1 | 8.1 | 8.1 |
| 70% Sorbitol Liquid | 11.0 | 11.0 | 11.0 |
| Peppermint Flavor | 1.3 | 1.3 | 1.3 |
| Sweetener | 0.3[a] | 0.6[b] | 0.45[c] |
|  | 100.0% | 100.0% | 100.0% |

[a]Uncoated aspartame
[b]Aspartame coated in Example 1
[c]Aspartame coated in Example 2

When gum samples of Examples 6 through 8 are stored in sealed pouches at 85° F. and tested for remaining aspartame after 0, 1, 2, 4, 6 and 8 weeks of storage, the gums of Example 8 will show an increased aspartame stability compared to the gum of Example 6.

EXAMPLE 9

An 866 gram quantity of 5% acesulfame K solution with a pH of 11.7 was mixed with 2600 gram of a 10% zein solution with a pH of 11.4, giving a total solid content of 303 grams in a solution of 8.74% solids. This mixture did not coagulate. It was spray dried, giving a powder having an estimated active acesulfame K level of 14.2%. A comparative example of acesulfame K spray dried with zein/alcohol could not be prepared since special equipment was not available as is normally required to spray dry with flammable solvents.

EXAMPLES 10 AND 11

(Example 11 Comparative)

Gum was prepared using the coated acesulfame K of Example 9 and uncoated acesulfame K with the following formulation:

|  | Example 10 | Example 11 |
| --- | --- | --- |
| Gum Base | 25.5% | 25.5% |
| Lecithin | 0.2 | 0.2 |
| Sorbitol | 48.1 | 49.3 |
| Mannitol | 8.0 | 8.0 |
| Glycerin | 8.6 | 8.6 |
| Lycasin | 6.8 | 6.8 |
| Peppermint Flavor | 1.4 | 1.4 |
| Sweetener | 1.4[a] | 0.2[b] |

[a]The Coated acesulfame K of Example 9
[b]Uncoated acesulfame K

Comparing Example 10 against Example 11, "chew out" tests demonstrated delayed release of the acesulfame K from the gum of Example 10 compared to the gum of Example 11.

EXAMPLE 12

A 30% zein, 70% active acesulfame K powder mixture is obtained by spray-drying an aqueous mixture of acesulfame K and zein dispersed in an aqueous, high-pH (pH of 11.6 to 12.0) media at 15% solids.

EXAMPLE 13

A 30% zein, 70% active acesulfame K powder mixture is obtained by fluid bed coating acesulfame K with an aqueous, high-pH (pH=11.6 to 12.0) zein dispersion of 15% solids).

EXAMPLE 14

A 20% zein, 80% active acesulfame K powder mixture is obtained by agglomerating acesulfame K and zein dissolved in high-pH water (11.6–12.0) at 15% solids, with the resulting product being dried and ground.

EXAMPLE 15

Acesulfame K is spray dried with a 25% solution of gelatin. The spray dried product is then agglomerated with a 15% solids, high-pH, aqueous solution of zein. The final product will contain about 50% active acesulfame K, 20% gelatin, and 30% zein.

EXAMPLE 16

Acesulfame K and thaumatin in a 9/1 ratio are dissolved in water with a 30% solution of gelatin and spray dried. This spray dried powder is then agglomerated with a high-pH aqueous 15% zein solution. The mixture is dried and ground and gives a product containing 45% acesulfame K, 5% thaumatin, 35% gelatin, and 15% zein.

EXAMPLE 17

Acesulfame K and sucralose in a 3/1 ratio are blended together as a powder and then agglomerated with water and hydroxypropylmethyl cellulose (HPMC). This blend is dried, ground and agglomerated further with a high-pH, aqueous 15% solution of zein to obtain a product containing 51% acesulfame K, 17% sucralose, 12% HPMC and 20% zein.

EXAMPLE 18

A 30% zein, 70% active alitame powder mixture is obtained by spray drying an aqueous mixture of alitame and zein dispersed in an aqueous, high-pH (pH of 11.6–12.0) media at 15% solids.

EXAMPLE 19

A 30% zein, 70% active alitame powder mixture is obtained by fluid bed coating alitame with an aqueous, high-pH (pH=11.6–12.0) zein dispersion of 15% solids.

EXAMPLE 20

A 20% zein, 80% active alitame powder mixture is obtained by agglomerating alitame and zein dissolved in high-pH water (11.6–12.0) at 15% solids, with the resulting product being dried and ground.

EXAMPLE 21

Alitame is spray dried with a 25% solution of gelatin. The spray dried product is then agglomerated with a 15% solids, high-pH, aqueous solution of zein. The final product will contain about 50% active alitame, 20% gelatin, and 30% zein.

EXAMPLE 22

Alitame and thaumatin in a 1/1 ratio are dissolved in water with a 30% solution of gelatin and spray dried. This spray dried powder is then agglomerated with a high-pH aqueous 15% zein solution. The mixture is dried and ground and gives a product containing 25% alitame, 15% thaumatin, 35% gelatine, and 15% zein.

EXAMPLE 23

Alitame and sucralose in a ⅓ ratio are blended together as a powder and then agglomerated with water and hydroxypropylmethyl cellulose (HPMC). This blend is dried, ground and agglomerated further with a high-pH, aqueous 15% solution of zein to obtain a product containing 17% alitame, 51% sucralose, 12% HPMC and 20% zein.

EXAMPLE 24

A 30% zein, 70% active sodium cyclamate powder mixture is obtained by spray drying an aqueous mixture of sodium cyclamate and zein dispersed in an aqueous, high-pH (pH of 11.6–12.0) media at 15% solids.

EXAMPLE 25

A 30% zein, 70% active sodium cyclamate powder mixture is obtained by fluid bed coating sodium cyclamate with a an aqueous, high-pH (pH=11.6–12.0) zein dispersion of 15% solids.

EXAMPLE 26

A 20% zein, 80% active sodium cyclamate powder mixture is obtained by agglomerating sodium cyclamate and zein dissolved in high-pH water (11.6–12.0) at 15% solids, with the resulting product being dried and ground.

EXAMPLE 27

Sodium cyclamate is spray dried with a 25% solution of gelatin. The spray dried product is then agglomerated with a 15% solids, high-pH, aqueous solution of zein. The final product will contain about 50% active sodium cyclamate, 20% gelatin, and 30% zein.

EXAMPLE 28

Sodium cyclamate and thaumatin in a 24/1 ratio are dissolved in water with a 30% solution of gelatin and spray dried. This spray dried powder is then agglomerated with a high-pH aqueous 15% zein solution. The mixture is dried and ground and gives a product containing 48% sodium cyclamate, 2% thaumatin, 35% gelatin, and 15% zein.

EXAMPLE 29

Sodium cyclamate and sucralose in a 10/1 ratio are blended together as a powder and then agglomerated with water and hydroxypropylmethyl cellulose (HPMC). This blend is dried, ground and agglomerated further with a high-pH, aqueous 15% solution of zein to obtain a product containing 62% sodium cyclamate, 6% sucralose, 12% HPMC and 20% zein.

EXAMPLE 30

A 70% zein, 30% active glycyrrhizin powder mixture is obtained by spray drying an aqueous mixture of glycyrrhizin and zein dispersed in an aqueous, high-pH (pH of 11.6–12.0) media at 10% solids.

EXAMPLE 31

A 20% zein, 80% active glycyrrhizin powder mixture is obtained by fluid bed coating glycyrrhizin with a an aqueous, high-pH (pH=11.6-12.0) zein dispersion of 10% solids.

EXAMPLE 32

A 20% zein, 80% active glycyrrhizin powder mixture is obtained by agglomerating glycyrrhizin and zein dissolved in high-pH water (11.6-12.0) at 15% solids, with the resulting product being dried and ground.

EXAMPLE 33

Glycyrrhizin is spray dried with a 20% solution of gelatin. The spray dried product is then agglomerated with a 15% solids, high-pH, aqueous solution of zein. The final product will contain about 50% active glycyrrhizin, 20% gelatin, and 30% zein.

EXAMPLE 34

Glycyrrhizin and thaumatin in a 24/1 ratio are dissolved in water with a 10% solution of gelatin and spray dried. This spray dried powder is then agglomerated with a high-pH aqueous 15% zein solution. The mixture is dried and ground and gives a product containing 48% glycyrrhizin, 2% thaumatin, 35% gelatin, and 15% zein.

EXAMPLE 35

Glycyrrhizin and sodium cyclamate in a 1/1 ratio are blended together as a powder and then agglomerated with water and hydroxypropylmethyl cellulose (HPMC). This blend is dried, ground and agglomerated further with a high-pH, aqueous 15% solution of zein to obtain a product containing 34% sodium cyclamate, 34% glycyrrhizin, 12% HPMC and 20% zein.

EXAMPLE 36

A 70% zein, 30% active Neohesperidin dihydro-ehaleone ("NeoDHC") powder mixture is obtained by spray drying an aqueous mixture of NeoDHC and zein dispersed in an aqueous, high-pH (pH of 11.6-12.0) media at 10% solids.

EXAMPLE 37

A 20% zein, 80% active NeoDHC powder mixture is obtained by fluid bed coating NeoDHC with a an aqueous, high-pH (pH=11.6-12.0) zein dispersion of 10% solids.

EXAMPLE 38

A 20% zein, 80% active NeoDHC powder mixture is obtained by agglomerating NeoDHC and zein dissolved in high-pH water (11.6-12.0) at 15% solids, with the resulting product being dried and ground.

EXAMPLE 39

NeoDHC is spray dried with a 20% solution of gelatin. The spray dried product is then agglomerated with a 15% solids, high-pH, aqueous solution of zein. The final product will contain about 50% active NeoDHC, 20% gelatin, and 30% zein.

EXAMPLE 40

NeoDHC and thaumatin in a 1/1 ratio are dissolved in water with a 10% solution of gelatin and spray dried. This spray dried powder is then agglomerated with a high-pH aqueous 15% zein solution. The mixture is dried and ground and gives a product containing 25% NeoDHC, 25% thaumatin, 35% gelatin, and 15% zein.

EXAMPLE 41

NeoDHC and sodium cyclamate in a 1/5 ratio are blended together as a powder and then agglomerated with water and hydroxypropylmethyl cellulose (HPMC). This blend is dried, ground and agglomerated further with a high-pH, aqueous 15% solution of zein to obtain a product containing 55% sodium cyclamate, 11% NeoDHC, 14% HPMC and 20% zein.

Examples 12 to 41 may be used to make chewing gum of either sugar or sugarless variety. Sample formulas are given in Tables 1 to 3 below. (The formulas are based on the use of aspartame, acesulfame K, sucralose, saccharin, cyclamates, glycyrrhizin and stevioside, and should be adjusted for other sweeteners to account for their level of sweetness.)

TABLE 1

| | Sugar | Sugar With Sorbitol | Sugarless With Water | Sugarless With Lycasin | Sugarless No Water |
|---|---|---|---|---|---|
| Gum Base | 19.2 | 19.2 | 25.5 | 25.5 | 25.5 |
| Sugar | 55.45 | 53.45 | — | — | — |
| Sorbitol | — | 2.0 | 53.7 | 49.4 | 52.2 |
| Mannitol | — | — | 8.0 | 8.0 | 12.0 |
| Corn Syrup | 13.1 | 13.1 | — | — | — |
| Lycasin/ Sorbitol Liquid | — | — | 9.5$^{(a)}$ | 6.8$^{(b)}$ | — |
| Glycerin | 1.4 | 1.4 | 1.5 | 8.5 | 8.5 |
| Lecithin | — | — | 0.2 | 0.2 | 0.2 |
| Dextrose Monohydrate | 9.9 | 9.9 | — | — | — |
| Flavor | 0.9 | 0.9 | 1.5 | 1.5 | 1.5 |
| Level of Active Sweetener | 0.05 | 0.05 | 0.1 | 0.1 | 0.1 |

$^{(a)}$liquid sorbitol (70% sorbitol, 30% water)
$^{(b)}$hydrogenated starch hydrolyzate syrup

TABLE 2

| | A | B | C | D | E | F | G |
|---|---|---|---|---|---|---|---|
| Gum Base | 19.2 | 19.2 | 19.2 | 19.2 | 19.2 | 19.2 | 19.2 |
| Sugar | 59.4 | 50.4 | 49.4 | 49.4 | 50.4 | 52.4 | 52.4 |
| Glycerin | 1.4 | 1.4 | 1.4 | 1.4 | 1.4 | 1.4 | 1.4 |
| Corn Syrup | 19.0 | 23.0 | 19.0 | 19.0 | 23.0 | 16.0 | 16.0 |
| Dextrose | — | — | 5.0 | — | — | — | — |
| Lactose | — | — | — | — | 5.0 | — | — |
| Fructose | — | — | 5.0 | — | — | — | — |
| Invert Sugar | — | — | — | 10.0 | — | — | — |
| Maltose | — | — | — | — | — | 10.0 | — |
| Palatinose | — | — | — | — | — | — | 10.0 |
| Corn Syrup Solids | — | 5.0 | — | — | — | — | — |
| Peppermint Flavor | 0.9 | 0.9 | 0.9 | 0.9 | 0.9 | 0.9 | 0.9 |
| Level of Active Sweetener | 0.1 | 0.1 | 0.1 | 0.1 | 0.1 | 0.1 | 0.1 |

TABLE 3

| | H | I | J | K | L | M | N | O | P |
|---|---|---|---|---|---|---|---|---|---|
| | (Wt. %) | | | | | | | | |
| Base | 25.5 | 25.5 | 25.5 | 25.5 | 25.5 | 25.5 | 25.5 | 25.5 | 25.5 |
| Sorbitol | 53.9 | 46.9 | 41.9 | 41.9 | 41.9 | 41.9 | 36.9 | 37.9 | 46.9 |
| Sorbitol Liquid/Lycasin | 17.0 | 14.0 | 6.0 | — | 5.0 | — | — | 6.0[a] | 18.0[a] |
| Mannitol | — | 10.0 | 8.0 | 8.0 | 8.0 | 8.0 | 8.0 | 8.0 | 8.0 |
| Maltitol | — | — | — | 5.0 | — | — | 5.0 | — | — |
| Xylitol | — | — | 15.0 | 10.0 | — | — | 5.0 | 15.0 | — |
| Lactitol | — | — | — | — | 10.0 | — | — | — | — |
| Palatinit | — | — | — | — | — | 15.0 | 10.0 | — | — |
| Glycerin | 2.0 | 2.0 | 2.0 | 8.0 | 8.0 | 8.0 | 8.0 | 6.0 | — |
| Flavor | 1.5 | 1.5 | 1.5 | 1.5 | 1.5 | 1.5 | 1.5 | 1.5 | 1.5 |
| Level of Active Sweetener | 0.1 | 0.1 | 0.1 | 0.1 | 0.1 | 0.1 | 0.1 | 0.1 | 0.1 |

[a] lycasin, all others use sorbitol liquid

EXAMPLE 42

First, 5.65 grams of sodium hydroxide was added to about 950 grams of water to thereby produce water with a pH in the range of 11.6 to 11.9. Next, about 204 grams of zein powder obtained from the Freeman Company, which zein had a moisture content of 4.13 weight percent, was added to 950 grams of water. The zein solution thus had a zein content of about 15.4%.

About 50 grams of unmilled aspartame from the NUTRA SWEET Company was placed in a shallow pan and granulated with 50.5 grams of the above described zein solution. This was accomplished by adding increments of between 10 and 20 grams of the zein solution every 3 to 5 minutes with hand mixing to form a granulation. The damp mix that resulted was dustless, and compacts when squeezed. The dam mix was transferred to stainless steel trays spread to a depth of approximately 1 to 2 centimeters. At this point, the material was approximately 44 weight percent water, 8 weight percent zein, and 48 weight percent aspartame. The trays were placed in a oven and heated to 170° F. for 18 to 20 hours. After drying, the mix was ground in a Fitzmill at high speed while using a 0.4 inch screen. The water content of the final product was between 2 and 5 weight percent.

EXAMPLE 43

The coated particles of Example 42 were used in a sugarless cinnamon flavor chewing gum with the following formulation:

| | |
|---|---|
| Gum Base | 25.1% |
| Sorbitol | 44.8% |
| Xylitol | 15.0% |
| Mannitol | 4.0% |
| Glycerin | 9.0% |
| Cinnamon Flavor | 1.6% |
| Sweetener | 0.5% |

Even though the zein coating on the aspartame was not sufficient to stabilize the aspartame with respect to the aldehyde in the cinnamon flavor, it is expected that the coating of Example 42 would delay the release of the aspartame from chewing gum. Also, it is expected that with higher levels (about 60%) of zein, it may be possible to obtain stability of aspartame in a cinnamon-flavored gum.

The preferred embodiment, which uses an aqueous solution of zein, offers advantages in that a zein coating can be applied to a high-potency sweetener and a chewing gum without resorting to the use of ethyl alcohol as a solvent. This reduces the cost of using zein. That is, when using zein in an aqueous solution as opposed to ethyl alcohol, there is no danger of explosion, fire, or toxic effects.

It should be understood that the preferred embodiment described in detail herein is illustrative of various aspects of the invention, and that various modifications and changes to the presently preferred embodiment may be made. Therefore, the following claims, including all equivalents, define the scope of the invention.

We claim:

1. A method of producing chewing gum with a zein coated, high-potency sweetener comprising the steps of:
   a) preparing a solution of zein dissolved in water with a pH of between about 11.5 and about 12.1% with a zein content of between about 1% and about 25%;
   b) combining a high-potency sweetener with the aqueous zein solution to form a zein coated, high-potency sweetener; and
   c) mixing the zein coated, high-potency sweetener in a chewing gum formulation.

2. The method of claim 1 wherein the high-potency sweetener is selected from the group consisting of aspartame, alitame, acesulfame K and other acesulfame salts, sucralose, saccharin, and its salts, cyclamic acid and its salts, thaumatin, monellin, glycyrrhizin, dihydrochalcones, stevioside and combinations thereof.

3. The method of claim 1 wherein the coating step is select from the group consisting of spray drying, fluid bed coating, coacervation, agglomeration, and combinations thereof.

4. The method of claim 1 wherein the sweetener comprises a salt and wherein the combining and coating steps comprise providing the sweetener salt in an aqueous solution and combining the solutions such that the zein does not coagulate before the coating step is completed.

5. The method of claim 4 wherein the acesulfame K solution is about 5% or less acesulfame K and is added to the zein solution.

6. The method of claim 1 wherein the step of forming a zein coated, high-potency sweetener is selected from the group consisting of spray drying and fluid bed coating.

7. A process for coating high-potency sweeteners with zein comprising the steps of:

a) preparing a solution of zein dissolved in water with the pH of between about 11.5 and about 12.1 and with a zein content of between about 1% and about 25%, and b) combining the high-potency sweetener with the aqueous zein solution to form a zein coated, high-potency sweetener.

8. The method of claim 7 wherein the high-potency sweetener is selected from the group consisting of aspartame, alitame, acesulfame K and other acesulfame salts, sucralose, saccharin and its salts, cyclamic acid and its salts, thaumatin, monellin, glycyrrhizin, dihydrochalcones, stevioside and combinations thereof.

9. The method of claim 7 wherein the coating step is select from the group consisting of spray drying, fluid bed coating, coacervation, agglomeration, and combinations thereof.

10. The method of claim 7 wherein the sweetener comprises a salt and wherein the combining and coating steps comprise providing the sweetener salt in an aqueous solution and combining the solutions such that the zein does not coagulate before the coating step is completed.

11. The method of claim 7 wherein the acesulfame K solution is about 5% or less acesulfame K and is added to the zein solution.

12. The method of claim 7 wherein the step of forming a zein coated, high-potency sweetener is selected from the group consisting of spray drying and fluid bed coating.

* * * * *

UNITED STATES PATENT AND TRADEMARK OFFICE
CERTIFICATE OF CORRECTION

PATENT NO. : 5,112,625

DATED : May 12, 1992

INVENTOR(S) : Steven E. Zibell, et al

Page 1 of 3

It is certified that error appears in the above-indentified patent and that said Letters Patent is hereby corrected as shown below:

In column 1, line 61, please delete "two step" and substitute therefor --two-step--.

In column 2, line 36, please delete "Nos." and substitute therefor --No.--.

In column 2, line 36, please delete "Nos." and substitute therefor --No.--.

In column 3, line 16, after "i.e." please insert --,--.

In column 3, line 48, please delete "percent".

In column 3, line 64, after "such" please insert --as--.

In column 5, line 53, please delete "coca" and substitute therefor --cocoa--.

In column 5, line 60, after "gum" please insert --,--.

In column 6, line 48, after "percent" please insert --,--.

In column 6, line 51, please delete "mixture" and substitute therefor --mixtures--.

UNITED STATES PATENT AND TRADEMARK OFFICE
CERTIFICATE OF CORRECTION

PATENT NO. : 5,112,625

DATED : May 12, 1992

INVENTOR(S) : Steven E. Zibell et al.

It is certified that error appears in the above-identified patent and that said Letters Patent is hereby corrected as shown below:

In column 7, line 29, please delete "60-percent" and substitute therefor --60 percent--.

In column 7, line 60, please delete "Example" and substitute therefor --Examples--.

In column 7, line 63, please delete "slows" and substitute therefor --slow--.

In column 7, line 65, please delete "slow" and substitute therefor --slows--.

In column 8, line 30, please delete "gums" and substitute therefor --gum--.

In column 8, line 36, please delete "gram" and substitute therefor --grams--.

In column 8, line 62, footnote "a" of the table under the heading "EXAMPLES 10 AND 11", please delete "Coated" and substitute therefor --coated--.

In column 9, line 4, please delete "spray-drying" and substitute therefor --spray drying--.

In column 9, line 12, after "solids" please delete ")".

In column 10, line 8, please delete "gelatine," and substitute therefor --gelatin--.

UNITED STATES PATENT AND TRADEMARK OFFICE
CERTIFICATE OF CORRECTION

PATENT NO.  : 5,112,625
DATED       : May 12, 1992
INVENTOR(S) : Steven E. Zibell et al.

It is certified that error appears in the above-identified patent and that said Letters Patent is hereby corrected as shown below:

In column 10, line 28, after "with" please delete "a".

In column 11, line 4, after "with" please delete "a".

In column 11, line 44, please delete "ehaleone" and substitute therefor --chaleone--.

In column 11, line 52, after "with" please delete "a".

In column 13, line 20, please delete "was" and substitute therefor --were--.

In column 13, line 39, before "oven" please delete "a" and substitute therefor --an--.

IN THE CLAIMS

In claim 3, line 2, please delete "select" and substitute therefor --selected--.

In claim 9, line 2, please delete "select" and substitute therefor --selected--.

Signed and Sealed this

Twenty-sixth Day of October, 1993

BRUCE LEHMAN

Attest:

Attesting Officer

Commissioner of Patents and Trademarks